F. T. PAINE.
Soda Fountain With Double Faucets.
No. 168,280.  Patented Sept. 28, 1875.
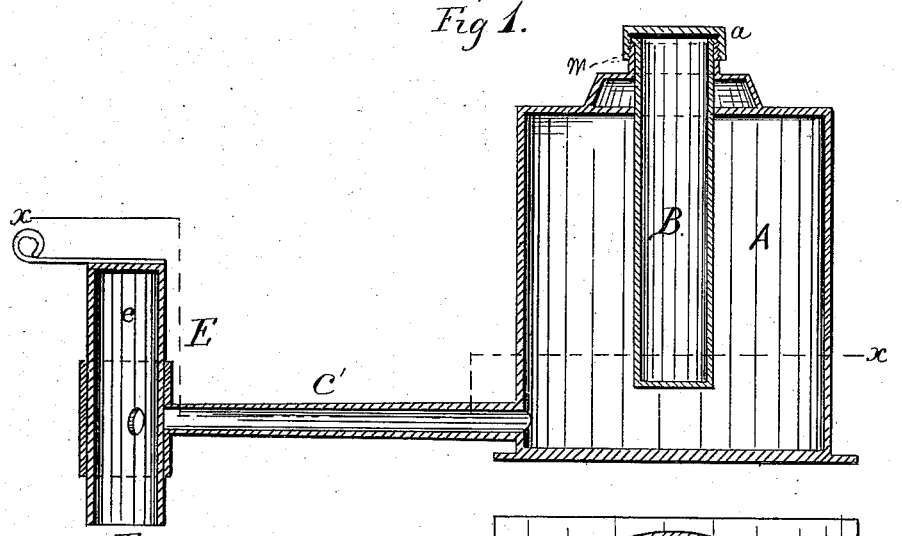
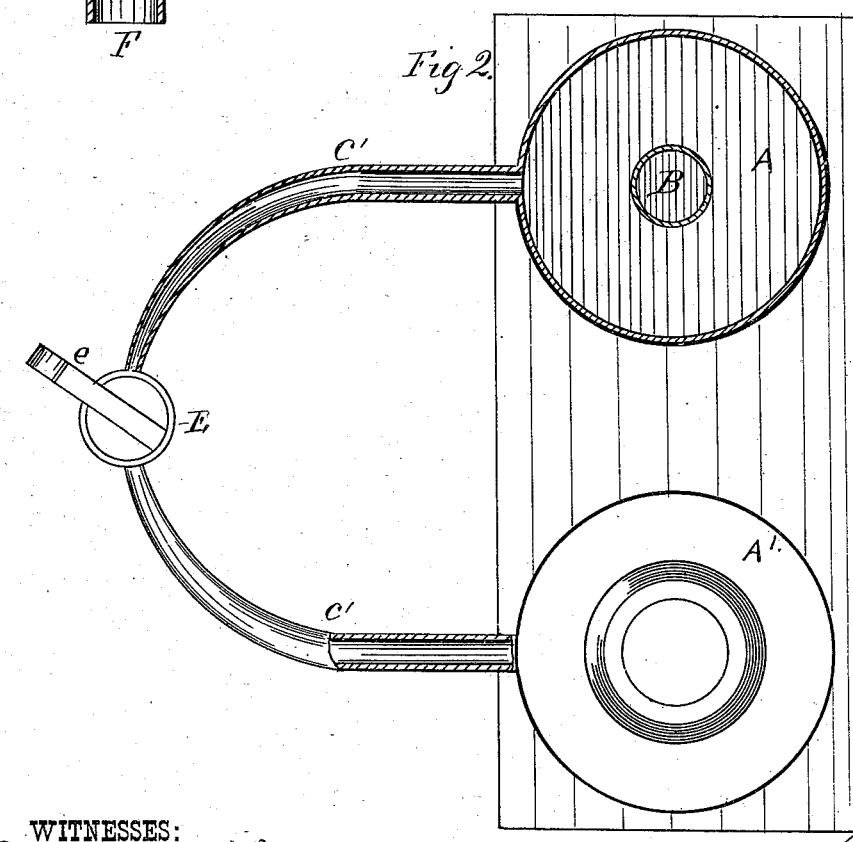
WITNESSES:
INVENTOR.
ATTORNEY.

UNITED STATES PATENT OFFICE.

FREDERICK T. PAINE, OF IUKA, MISSISSIPPI.

IMPROVEMENT IN SODA-FOUNTAINS WITH DOUBLE FAUCETS.

Specification forming part of Letters Patent No. 168,280, dated September 28, 1875; application filed July 28, 1875.

*To all whom it may concern:*

Be it known that I, FREDERICK TURNER PAINE, of Iuka, in the county of Tishomingo and State of Mississippi, have invented certain new and useful Improvements in Soda-Founts with Double Faucets; and I do hereby declare that the following is a full, clear, and exact description thereof, which will enable others skilled in the art to which it pertains to make and use the same, reference being had to the accompanying drawing, and to the letters of reference marked thereon, which form a part of this specification.

This invention relates to the manufacture of soda-water, and belongs to that portion of the apparatus known as a generator, in which the chemicals are placed and brought together, and dispensed through the double tube C C', and in certain constructions, to be hereinafter more fully described by the aid of the accompanying drawings and letters of reference marked thereon, in which—

Figure 1 is a sectional side elevation. Fig. 2 is a part sectional plan.

The main part of the apparatus consists of two separate vessels, A A', which are each provided with suitable tight-fitting tops $a$ $a'$. Let down from the top into the vessels A A', nearly to the bottom thereof, are two coolers, B B. These are constructed so that the tops $a$ $a'$ fit down upon them and hold them in position, said coolers making the filling for the neck of the vessels and preventing air going into them, as is seen at $m$, and when used are to be filled with ice.

For the purpose of drawing off the materials from the vessels A A', there is provided the double tube C', properly secured and made of suitable material. Said pipes are brought together at a spile or stem or double faucet, E, and by opening the valve $e$ the materials are made to simultaneously mix, and are discharged at F.

Having thus described my invention, what I claim, and desire to secure by Letters Patent of the United States, is—

In a soda-water apparatus, two independent vessels, A A', provided with covers $a$ $a'$, having separate cooling vessels, and both vessels provided with pipes C C', having a meeting faucet, E, substantially as herein specified.

In testimony that I claim the foregoing as my own I affix my signature in presence of two witnesses.

FREDERICK TURNER PAINE.

Witnesses:
GEO. P. HAMMEDY,
C. J. HYATT.